Patented Apr. 15, 1947

2,418,978

UNITED STATES PATENT OFFICE 2,418,978

METHOD FOR HARDENING OF POLYMERS

Willi Mertens, Berlin-Zehlendorf, Germany; vested in the Attorney General of the United States No Drawing. Application April 14, 1938, Serial No. 202,011. In Germany April 15, 1937

2 Claims. (Cl. 260—42)

The present invention relates to a method for hardening polymers.

When hardening polymerized natural or artificial substances having a structure with linear chain molecules, such as, for instance, polystyrene, polyacrylates, natural or synthetic rubber, drawbacks are presented in two respects. On the one hand, some of these substances cannot be hardened at all by the methods hitherto known. On the other hand, the polymers capable of being hardened show, when subjected to the usual vulcanization, an impairment of their dielectric properties which is undesirable for electrotechnical purposes; they show, particularly, an always disadvantageous increase of the loss angle and an increased dielectric constant which is also undesirable in most cases.

According to the invention the polymerized natural or artificial substances, particularly those which have a structure with linear chain molecules, are hardened in the following manner. These polymers are homogeneously mixed with mixtures of substances which are still capable of being polymerized and during the interpolymerization of which three-dimensional macromolecules are produced. This mixture is then caused to interpolymerize. The co-polymerization may be effected before or after giving the mixture the desired shape. These mixed polymers are produced, as a rule, by the polymerization of a mixture of at least two materials capable of being polymerized with each other, of which at least one contains two groups susceptible to polymerization. For instance, the following known mixtures of substances are capable of being co-polymerized: styrene+divinylbenzol, acrylic acid ester+divinylbenzol or +divinylketone or +divinylether or +vinylpropenylbenzol, vinylether+divinylketone or +vinylpropenylbenzol.

A surprising result of the invention is that the products obtained present properties particularly desirable in the field of artificial substances. The invention further enlarges the field of application of the mixed polymers consisting of three-dimensional macromolecules. These mixed polymers are, as is well known, brittle, infusible and insoluble transparent substances, as may be deduced from their three-dimensional molecular structure. Accordingly, the technical application of the mixed polymers, particularly when being pressed and sprayed, is extremely difficult owing to their brittleless and infusibility. These difficulties are materially reduced or entirely avoided by the invention.

The products obtained by the invention are harder than the already polymerized basic substances employed for the manufacture of the products; this may be called a pseudo-vulcanization. The products, further, are tougher and more resistant to heat, but are insoluble and often only capable of swelling in the usual solvents (particularly in the aromatic hydrocarbons, such as benzol, toluene or xylene). A particular advantage of the invention consists in the fact that it is also possible to produce materials which are capable of being fused and sprayed, the temperatures at which these substances are employed lying, of course, higher than that of the starting substances. A further essential advantage consists in the fact that the materials according to the invention do not age, or in any event not to a greater extent than the starting substances, and need not contain additional constituents such as fillers, vulcanization accelerators or the like. If substances with a particularly low dielectric loss angle are to be produced, which is readily possible, it is advisable to use starting substances which consist only of pure hydrocarbons or of substances having a small total dipole moment.

Depending upon the kind and the quantity of the homogeneous mixture of the starting substances subjected to the polymerization process, any desired condition of the product may be obtained. It is particularly favorable that the copolymerization of the starting substances still to be polymerized may be effected in the pre-polymerized starting substance even after giving the body to be produced its desired final shape, since in this manner a shaped body may be produced in a soft state and may then be hardened only by the application of heat.

*Example 1*

75 parts by weight of polystyrene are homogeneously mixed with 25 parts by weight of a mixture consisting of styrene and 1% paradivinylbenzol, whereby a swelling is effected, and the mixture is polymerized for about 24 to 48 hours at a temperature of 130° centigrade. The transparent material thus produced is highly resistant to deformation, does not tend to form cracks as does polystyrene, and is capable of being sprayed. The softening point lies 10° centigrade above the softening point of the pure polystyrene employed.

Example 2

75 parts by weight of polyacrylic acid-isobutylester and 25 parts by weight of the mixture styrene+1% paradivinylbenzol are homogeneously mixed, whereby a swelling is effected. The mixture is then finally polymerized. The material thus produced has approximately the properties of slightly vulcanized rubber. If another mixing ratio is chosen, for instance a ratio of 50 parts by weight to 50 parts by weight of the starting substances, a non-transparent leather-like material is obtained.

Example 3

The mixture of 70 parts by weight of a highly polymeric substance known as "Oppanol B 200" and consisting of polyisobutylene with 30 parts by weight of the mixture styrene+1% divinylbenzol produced on a mixing roller or on another mixing device, if necessary by the application of moderate heat, is polmerized by heating. Also this product has a soft rubber-like character and it is again possible to obtain leather-like materials by varying the mixing proportion of the starting substances.

In the case of tenacious substances difficult to be mixed, an intimate mixture with other substances may be obtained by undercooling the tenacious substances until they may be finely divided. In this state they may be mixed with the other substances.

When treating highly molecular substances having as above described a structure with linear chain molecules, it may happen that these substances smear superficially during the polymerization process and thereby become defective. Such a smearing has not yet been observed in other treatments effected with such highly molecular substances with linear chain structure. This is probably due to the fact that the highly molecular substances here in point are in the state of a solution when carrying out the method according to the invention and, consequently, may react very easily with the oxygen of ambient atmosphere.

This superficial smearing of the highly molecular substances, however, may be avoided by performing the method according to the invention in an atmosphere free of or at least poor in oxygen. By an atmosphere poor in oxygen is to be understood an atmosphere in which any oxygen content present has an innoxiously slight concentration. The method may be carried out by the use of a vacuum, a moderate vacuum being sufficient, which, for instance, may be produced with the aid of a water-jet pump. However, protective atmospheres such as inert gases, for instance nitrogen and carbonic acid, as well as water vapor, may also be employed. Furthermore, water itself is also applicable since its oxygen content is slight enough for the purposes here in point. Atmospheres poor in oxygen, as above described, are for instance, preferable when treating polyisobutylenes, polybutadienes, polyvinylethers and polyacrylates.

The method according to the invention presents particular advantages when used in the field of electrical engineering. The materials or bodies produced according to the invention may be employed for insulating purposes in various manners. For instance, electric conductors may be provided with an insulating cover produced according to the invention by any suitable spraying or pressing method. However, also construction elements of particularly complicated shape may be made to gauge without giving rise to a formation of cracks. The invention may also be used for the manufacture of semi-conductors by adding to the homogeneous mixture prior to the polymerization conductive or semi-conductive substances of the desired kind and in the desired amount.

The invention does not necessarily require that only one polymerized basic or starting substance, or only one mixture capable of being interpolymerized, be employed, or that the components of the mixture be pure. The invention may also be used for hardening substances or mixtures of substances which contain a plurality of polymerized components, or mixtures the components of which are not pure but mixed with other substances such as, for instance, softening agents, stretching agents etc. In the manufacture and treatment of the above-described mixtures the components may be combined in any desired manner, number and sequence. It is, for instance, possible to combine the components of the final mixture in various steps and, if desired, to polymerize the mixture in various steps.

The invention presents the further advantage that the products obtained according to the invention from basic substances capable of being vulcanized, may be subjected after the co-polymerization to a further vulcanization. It has been surprisingly found that the vulcanization of these substances requires so small amounts of vulcanizing agents that the dielectric properties of the materials are only very slightly affected, while the mechanical properties are improved so considerably as is possible only with great amounts of vulcanizing agents when vulcanizing substances not previously subjected to a method according to the invention. Besides having approved dielectric as well as mechanical properties not hitherto attained, the articles produced according to the invention can also be made highly resistant to heat, since the method according to the invention may be readily carried out in such a manner that the bodies produced in any thermoplastic condition are subsequently rendered free from the thermoplasticity by vulcanizing them to the desired extent.

The improvement attained by the vulcanization is apparent from the fact that the tensile strength of a substance containing natural rubber as a basic substance and produced according to the method of the invention by the use of a mixed polymer consisting of styrene and divinylbenzol, is increased by the vulcanization from 105 kg./cm.$^2$ and 70% elongation to 170 kg./cm.$^2$ and more than 450% elongation. In this case the quantity of sulphur (referred to the percentage of rubber) required for the vulcanization amounts only to 1% and less. Such high values of the tensile strength and elongation have hitherto been attained only in substances containing natural rubber as a basic substance if considerably higher degrees of vulcanization (i. e., for instance, as usual 3% sulphur) have been employed, in which case, however, a smaller hardness had to be put up with.

The vulcanization may be carried out in the case of all substances capable of being vulcanized and produced according to the invention, i. e., not only in the case of substances containing natural rubber as a basic substance, but also in the case of such substances containing artificial rubber. If natural rubber is employed it is preferable to render it free from, or at least poor in, protein before vulcanizing it, for which purpose various methods are known and have proved satisfactory in practice.

What is claimed is:

1. The method of producing electrically insulating articles which comprises the steps of preparing a homogeneous mixture consisting of 7 parts of polyisobutylene with 3 parts of a mixture consisting of styrene plus 1% of paradivinylbenzol, and applying heat until the substance thus produced has a soft rubber-like character.

2. An insulating solid body produced by the process of claim 1.

WILLI MERTENS.

REFERENCES CITED

The following references are of record in the file of this patent:

UNITED STATES PATENTS

| Number | Name | Date |
|---|---|---|
| 2,066,330 | Carothers et al. | Jan. 5, 1937 |
| 2,077,485 | Lawson et al. | Apr. 20, 1937 |
| 2,155,590 | Garvey | Apr. 25, 1939 |
| 2,120,006 | Strain | June 7, 1938 |
| 2,101,107 | Strain | Dec. 7, 1937 |
| 2,078,194 | Collins | Apr. 20, 1937 |
| 2,067,854 | MacDonald | Jan. 12, 1937 |
| 1,922,937 | Eckert | Aug. 15, 1933 |
| 2,202,846 | Garvey et al. | June 4, 1940 |
| 2,180,082 | Mueller-Cunradi et al. | Nov. 14, 1939 |
| 2,356,955 | Thomas | Aug. 29, 1944 |

FOREIGN PATENTS

| Number | Country | Date |
|---|---|---|
| 355,416 | British | Aug. 27, 1931 |
| 396,186 | British | Aug. 3, 1933 |
| 345,939 | British | Mar. 16, 1931 |